Nov. 16, 1926.
F. R. KING
SEPTIC TANK
Filed Feb. 7, 1925
1,607,280
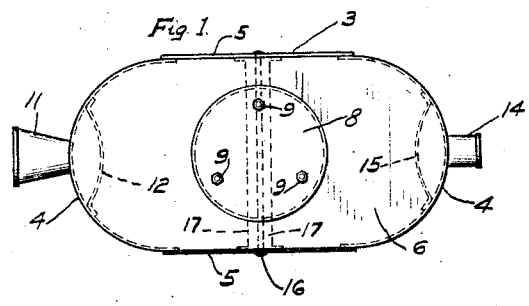
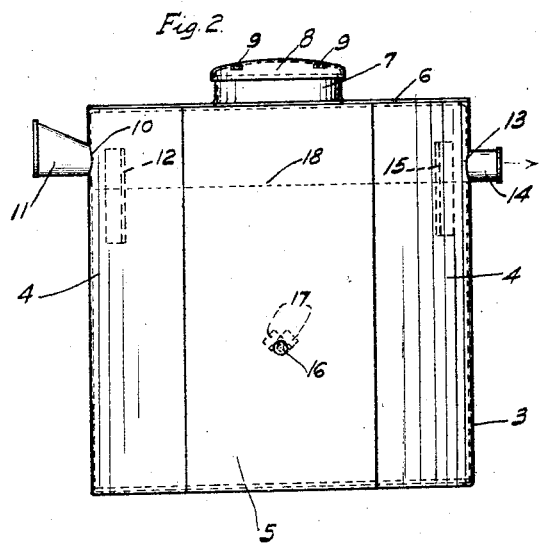
INVENTOR.
Frank R. King.
BY
Morsell, Keeney & Morsell
ATTORNEY.

Patented Nov. 16, 1926.

1,607,280

UNITED STATES PATENT OFFICE.

FRANK R. KING, OF MADISON, WISCONSIN, ASSIGNOR TO WESTERN METAL SPECIALTY CO., OF MILWAUKEE, WISCONSIN, A CORPORATION OF WISCONSIN.

SEPTIC TANK.

Application filed February 7, 1925. Serial No. 7,663.

This invention relates to improvements in septic tanks.

Septic tanks are employed in houses and buildings in rural districts where there is no municipal water supply and no sewerage system. The water supply for houses in such cases is usually supplied from a pump or large tank. The waste water is conducted by pipe to a septic tank where it enters an inlet opening and when the water rises to a certain level, it passes out through an outlet opening. In the meantime, however, sediment and matter in the water settles to the bottom of the tank where the greater proportion is destroyed by bacterial action.

It is the principal object of the present invention to provide a septic tank of novel shape and arranged with the inlet and outlet openings at a maximum distance apart in order that all possible sediment will settle while the water is passing from the inlet to the outlet opening.

A further object of the invention is to provide a septic tank constructed with an inlet opening pipe of tapering form to permit the reception of pipes of any size within certain limits.

A further object of the invention is to provide a septic tank which is of very simple construction, is strong and durable, is inexpensive to manufacture, is sanitary, and is well adapted for the purposes described.

With the above and other objects in view the invention consists of the improved septic tank and its parts and combinations as set forth in the claims and all equivalents thereof.

In the accompanying drawing in which the same reference characters indicate the same parts in all of the views:

Fig. 1 is a plan view of the improved septic tank; and

Fig. 2 is a side view thereof.

Referring now more particularly to the drawing it will appear that the septic tank 3 is substantially oblong in shape with rounded ends 4. The rounded ends 4 are formed of sheets of metal curved, and having their end edge portions welded, or otherwise secured, to flat side sheets 5. The tank is of considerable depth and is provided with a flat top 6 formed with a central neck 7, forming an opening for access to the interior of the tank, the openings being normally closed by a cover 8 held in place by bolts 9.

In one end portion of the tank, near the top thereof, an inlet opening 10 is provided, and projecting outwardly from said opening is a funnel shaped or inwardly tapering inlet connection 11. Secured to the inner wall of the end 4 adjacent the inlet opening is a curved baffle plate 12 to direct water entering the tank.

In the opposite end portion of the tank, near the top thereof, but slightly below the horizontal plane of the inlet opening, is an outlet opening 13 out of which an outlet connection pipe 14, of circular form in cross-section extends. A baffle plate 15, similar to the plate 12, is also arranged adjacent the outlet opening and is secured to the inner wall of the tank end.

The sides 5 of the tank are prevented from spreading by a rod 16 extending transversely therethrough and a pair of metallic members 17 secured to the inner surfaces of the tank sides.

In use, a pipe leading from the plumbing fixtures in the house conduct the waste water and the end portion of said pipe is fitted into the inlet connection 11 of the tank. If the pipe is of comparatively large circumference it will be received by the wider end portion of the member 11, while if it is of a somewhat smaller circumference it can be forced further into said member 11 to be engaged by the narrower portion thereof. Waste water, therefore, flows into the tank and strikes the baffle plate 12. The water level of the tank is indicated by the dotted line designated 18 and when the water passes this level, it will flow out through the opening 13 and discharge member 14 to be discharged by suitable pipes. Obviously, there is a relatively great distance between the inlet and outlet openings and during the time the water passes from one to the other, it has considerable time in which to deposit its sediment.

From the foregoing description it will be seen that the improved septic tank is of very simple and novel construction and is well adapted for the purpose set forth.

What I claim as my invention is:

1. A tank, comprising a tank member including a pair of rectangular, oppositely disposed and vertical sheets forming sides, and a pair of curved sheets forming ends and having their edge portions overlapped by and secured to the adjacent edge portions of the side sheets.

2. In a tank, a pair of rectangular, oppositely disposed and vertical sheets forming sides, a transverse rod connecting said sheets to prevent the same from spreading, a pair of curved sheets forming ends and having their edge portions welded to the adjacent edge portions of the side sheets, a flat top member and a flat bottom member for the tank, the top member having a central opening therein, and a cover closing said opening.

In testimony whereof, I affix my signature.

FRANK R. KING.